J. D. FARMER.
SAFETY STOP FOR VEHICLES.
APPLICATION FILED NOV. 4, 1919.

1,386,324. Patented Aug. 2, 1921.

INVENTOR.
James D. Farmer.

BY Harry De Wallace

ATTORNEY.

UNITED STATES PATENT OFFICE.

JAMES D. FARMER, OF BROWNVILLE, NEW YORK.

SAFETY-STOP FOR VEHICLES.

1,386,324.   Specification of Letters Patent.   Patented Aug. 2, 1921.

Application filed November 4, 1919. Serial No. 335,617.

*To all whom it may concern:*

Be it known that I, JAMES D. FARMER, a citizen of the United States, residing at Brownville, in the county of Jefferson and State of New York, have invented certain new and useful Improvements in Safety-Stops for Vehicles, of which the following is a specification.

This invention relates to improvements in safety stops for automobiles and other vehicles, and has for its object to provide novel, simple and effective devices for blocking the rear wheels of the vehicles, for preventing the vehicles from backing down hills, in case the engines stop and the brakes fail to hold the vehicles. And a further object is to provide a device of the class which is permanently attached to the vehicle and is controlled by the driver.

I attain these objects by the means set forth in the detailed description which follows, and as illustrated by the accompanying drawing, in which—

Figure 1:
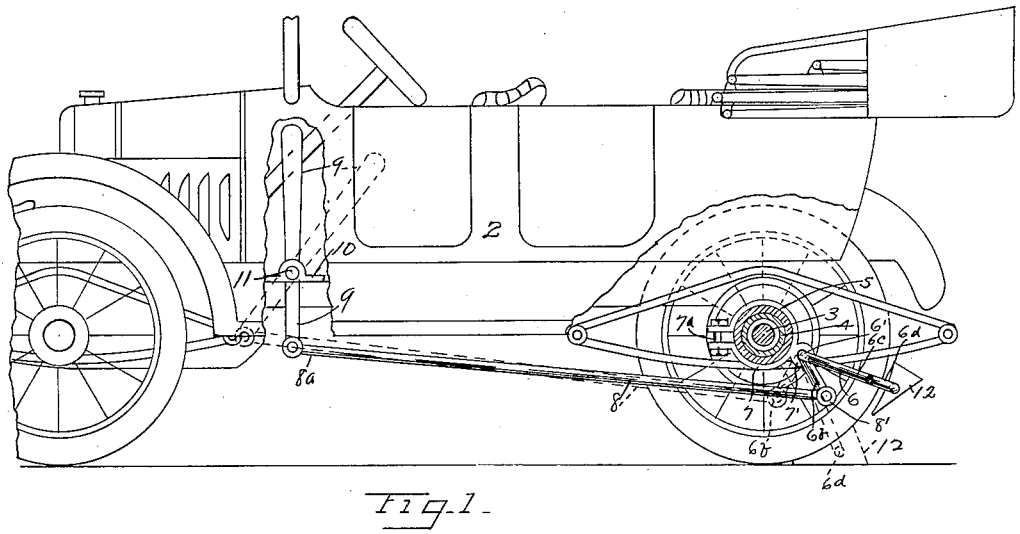
Figure 1 is a side elevation of an automobile, to which my improvement is applied, certain parts being cut away substantially on line 1—1 of Fig. 2 for showing the manner of applying and operating the device.

In the drawing, 2 represents generally an automobile. 3 is the rear axle, which is usually protected and supported by a tubular casing 4. 5 is the usual differential gear case, which is interposed between the parts of the rear axle and connects with the casing 4.

Figure 2:
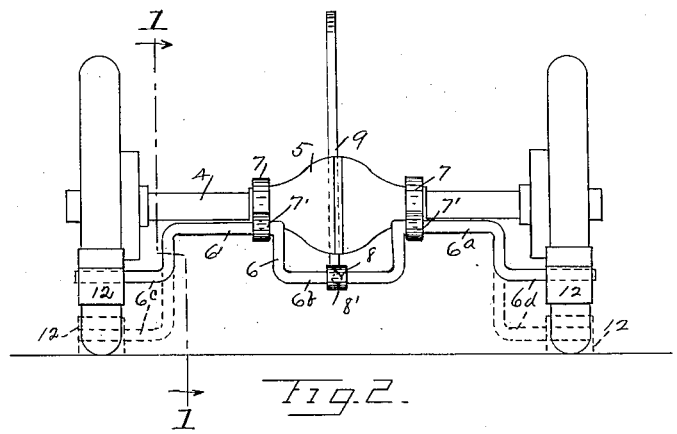
Fig. 2 is a view of the rear of the running-gear of the car, showing by full and dotted lines the operated and the released position of the safety stop.

My safety device comprises the following parts: 6 is a member or rod which extends transversely at the rear of the car, and has similar horizontal portions 6' and 6ª, which are pivoted in loop-bearings 7' of brackets 7, the latter being clamped around the ends of the differential casing and held in place by bolts 7ª. Between the portions 6' and 6ª is a downwardly projecting crank-like portion 6ᵇ, to which the rear end 8' of an operating rod 8 is pivoted. The rod 8 then extends forwardly beneath the car, and its forward end 8ª is pivoted to the lower end of a hand-lever 9, the said lever being pivotally supported on the floor of the car by means of a bracket 10 and a pin 11. This positions the upper end of the lever 9 in front of and within easy reach of the driver of the car. The opposite ends 6ᶜ and 6ᵈ of the member 6 are bent rearwardly and then laterally, and preferably extend to the outer faces of the rear wheels of the car. These ends of the member 6 are fitted with similar wedge-shaped blocks 12 which, when at rest, are normally positioned above and clear of the roadway, as well as clear of the rear wheels, as shown by the full lines in Figs. 1 and 2. In case the engine or other motive power stops, while the vehicle is ascending a hill or grade, the driver grasps the lever 9 and pulls it rearwardly. This movement of the lever 9, through the rod 8 partially rotates the member 6 and swings the blocks 12 downwardly and forwardly beneath the rear wheels, as shown by the dotted lines in Figs. 1 and 2. This effectually blocks and holds the vehicle until the engine is started. As soon as the engine moves the car forwardly enough to free the blocks 12, the driver pushes the lever 9 forwardly, which restores all of the safety parts to the full line or idle position, shown in the drawing, ready for the next operation.

Having thus described my invention, what I claim as new and desire to secure by Letters Patent, is—

In a safety stop for vehicles, the combination with the operating rod, of a rocking member disposed transversely at the rear of the vehicle, a pair of clamps for pivotally securing said member to the rear axle, the medial portion of said member comprising a crank to which said rod is attached, the opposite ends of said member comprising similar cranks disposed concentric to the medial crank which extend across the outer rear faces of the corresponding rear wheels, and a block mounted on each of said end cranks in the paths of said wheels.

In testimony whereof I affix my signature.

JAMES D. FARMER.